United States Patent Office 2,755,287
Patented July 17, 1956

2,755,287

NEW INDOLINES

Emil Schlittler, Madison, N. J., and Johannes Mueller, Arlesheim, Switzerland, assignors to Ciba Pharmaceutical Products, Inc., Summit, N. J.

No Drawing. Application January 28, 1953, Serial No. 333,839

Claims priority, application Switzerland February 8, 1952

10 Claims. (Cl. 260—319)

This invention relates to Bz-carbamyloxy indolines the nucleus of which has the formula

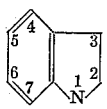

and of their acid salts and quaternary ammonium compounds. These indolines may also be further substituted both in the carbamyl radical and also in the nucleus, as for example by alkyl, such as methyl, ethyl, butyl or hexyl, alkenyl, such as allyl, alkylene, such as pentylene or butylene, cycloalkyl, such as cyclopentyl, cyclohexyl or cycloheptyl, aryl or heterocyclic radicals or also, in the benzene nucleus, for example, by halogen atoms, such as chlorine. The invention concerns especially 6-carbamyloxy-1-alkyl indolines, as for example the 1-alkyl-6-(N-alkyl-, N:N-dialkyl- or N:N-alkylene-carbamyloxy)-indolines, and also their acid salts, preferably their quaternary 1-derivatives, such as their 1:1-dialkylindolinium salts, especially the 1:1-dimethyl-6-(N-methyl-carbamyloxy)-indolinium salts, such as the bromide of the formula

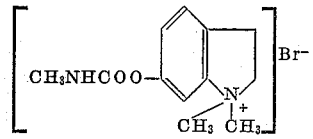

These compounds possess a pharmacological activity similar to that of physostigmine and are intended for use as medicaments.

The new indolines are obtained when in indolines having the nucleus of the formula

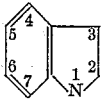

which contain in the benzene nucleus a free hydroxyl group, this latter is converted directly or in stages into a carbamyloxy group. Thus for example Bz-hydroxyindolines may be subjected to the action of a carbamic acid halide or an isocyanic acid ester which latter may be formed in the course of the reaction. In carrying out the reaction in stages, the process can be conducted, for example, in such manner that the hydroxyindoline is first converted with phosgene into a chlorcarbonic acid ester and this latter thereupon reacted with ammonia or primary or secondary amines. The hydroxyindolines can also be used in the reaction in the form of their acid salts or quaternary compounds. In the latter case, there are obtained the quaternary ammonium compounds, which can also be produced by quaternizing the corresponding Bz-carbamyloxy indolines having a tertiary amino group, preferably with an agent capable of introducing an alkyl radical, such as an ethyl, propyl or butyl or especially a methyl radical. Thus, for example, the tertiary amines may be treated with reactive esters of strong inorganic or organic acids, as for example with esters of the hydrohalic acids, of sulfuric acid or of organic sulfonic acids, as with alkyl halides, alkyl sulfates or toluene sulfonates.

The reactions to be carried out according to the invention can be effected in the presence or absence of diluents, at ordinary or elevated temperature, in open vessels or in closed vessels under pressure, if desired in the presence of condensing agents and/or of catalysts.

According to the method of working, the new compounds are obtained in the form of the free bases or their salts. From the latter, in the customary manner, the free amine or ammonium bases can be produced. Conversely, from the latter, by reaction with corresponding organic or inorganic acids, therapeutically applicable or non-toxic acid salts may be produced, as for example those of the hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or of therapeutically active acids.

The following examples illustrate the invention, the relation between part by weight and part by volume being the same as that between the gram and cubic centimeter:

Example 1

6.8 parts by weight of 1-methyl-5-hydroxy-indoline are treated with 0.3 part by weight of triethylamine and subsequently with 15 parts by volume of methyl-isocyanate, in portions with cooling, whereby the whole gradually passes into solution. The mixture is then allowed to stand for 24 hours at 20° C., whereby a portion of the 1-methyl-5-(N-methyl-carbamyloxy)-indoline produced of the formula

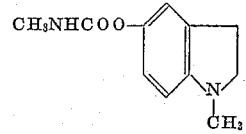

separates as a compact crystallizate. When recrystallized from ether and sublimed in a high vacuum at 130° C. under 0.1 mm. pressure, it melts at 96–97° C.

For recovery of the remaining fractions, the crystals are filtered off, the mother liquid dissolved in 100 parts by volume of ether and, with the addition of ice, in an atmosphere of nitrogen, extracted by shaking carried out twice with 20 parts by volume of 2 N-caustic soda solution each time. The ether solution is washed three times with water and saturated common salt solution, dried with sodium sulfate and evaporated in a water pump vacuum, whereby the residue crystallizes. From the crude crystallizate, there is obtained by sublimation, crystallization and repeated sublimation, a further quantity of the above specified compound.

By reaction thereof with an excess of methyl bromide in benzene at 20° C., there is obtained the 1:1-dimethyl-5-(N-methyl-carbamyloxy)-indolinium bromide of M. P. 248–250° C.

The 1-methyl-5-hydroxy-indoline used as starting material can be prepared, for example, in the following manner:

60 parts by weight of 1-methyl-5-hydroxy-oxindole (Julian, Pikl and Wantz, J. A. C. S. 57, 2029 (1935)) are dissolved with heating in 2000 parts by volume of tetrahydrofurane and the solution cooled and, in an atmosphere of nitrogen free from carbon dioxide, slowly introduced into 60 parts by weight of lithium-aluminum hydride in 300 parts by volume of ether and the mixture boiled for 4 hours under reflux. After cooling, the whole is carefully treated with 600 parts by weight of ice, then, with further cooling, with 120 parts by volume of concentrated hydrochloric acid, the tetrahydrofurane distilled off on the water bath and the residue diluted with 600 parts by volume of water and a further 120 parts by volume of concentrated hydrochloric acid added. The solution, acid to Congo red, is, with exclusion of air, extracted three times with 500 parts by volume of ether each time, brought to a pH of about 9 with concentrated aqueous ammonia with good cooling, and extracted with ether. The final ether extract is washed with water and saturated common salt solution, dried with sodium sulfate and evaporated. The oily residue is distilled at 171–175° C. under 12 mm. pressure, whereby a colorless oil passes over which slowly becomes yellowish and after some time solidifies. When recrystallized from ether and sublimed twice under 12 mm. pressure, the 1-methyl-5-hydroxy-indoline melts at 94–97° C. It is extremely sensitive to air and light.

*Example 2*

To 4.0 parts by weight of 1-methyl-5-hydroxy-indoline, dissolved in 90 parts by volume of benzene, 5.0 parts by weight of triethylamine are added and into the mixture, brought to boiling, 5.7 parts by weight of dimethyl carbamyl chloride are gradually introduced. Thereupon the whole is boiled under reflux for a further 4 hours. The solution is evaporated to one third of its volume, allowed to stand overnight, filtered from the triethylamine hydrochloride formed and, after complete removal of the solvent, distilled at 133–140° C. under 0.1 mm. pressure. The distillate is taken up in 50 parts by volume of benzene and treated, in the manner described in Example 1, twice with 20 parts by volume of 2 N-caustic soda solution each time and worked up. The 1-methyl-5-(N:N-dimethyl-carbamyloxy)-indoline of the formula

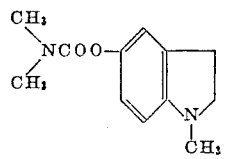

obtained by sublimation of the crystalline residue at 80° C. under 0.1 mm. pressure, after recrystallization from ether and sublimation, melts at 83.5–84.5° C.

*Example 3*

To the boiling solution of 4.0 parts by weight of 1-methyl-5-hydroxy-indoline and 5.0 parts by weight of triethylamine in 90 parts by volume of benzene, 6.8 parts by weight of pentamethylene carbamyl chloride are gradually added and subsequently the whole is boiled under reflux for 4 hours. The solution is concentrated to one third of its volume, allowed to stand overnight, filtered from triethylamine hydrochloride formed, the filtrate completely freed from solvent and the residue distilled at 160–170° C. under 0.1 mm. pressure. The 1-methyl-5-(N:N-pentamethylene-carbamyloxy)-indoline of the formula

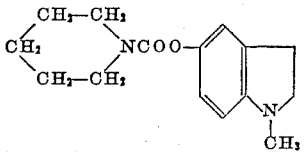

passes over as a colorless oil which immediately crystallizes. After recrystallization from benzene-petrol ether and repeated high vacuum sublimation, the substance has the melting point 79–81° C.

*Example 4*

2.3 parts by weight of crude 1-methyl-3:3-[3'-methyl-3'-azapentylene-(1':5')]-5-hydroxy-indoline are treated with 0.2 part by weight of triethylamine and then, with cooling and stirring, with 7.5 parts by volume of methyl isocyanate in portions. After all the solid material has passed into solution, the mixture is allowed to stand for 24 hours at 20° C. The excess of methyl isocyanate is removed in vacuum and the residue exhaustively extracted with, in all, 70–100 parts by volume of hot benzene. The benzene solution is worked up as described in Examples 1 and 2. In this manner the 1-methyl-3:3-[3'-methyl - 3' - azapentylene-(1':5')]-5-(N-methylcarbamyloxy)-indoline of the formula

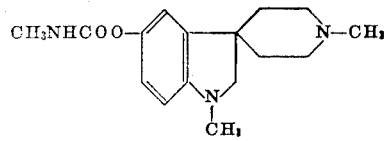

crystallizes immediately after evaporation of the benzene solution. After recrystallization twice from benzene-petrol ether, it melts at 140–141° C. The free base can be converted into the hydrochloride of melting point 230–232° by dissolving it in a small quantity of dry methanol, adding the calculated amount of methanolic solution of hydrochloric acid of 10 per cent strength, and crystallizing by addition of an excess of dry ether. By treating one part by weight of the free base with 10 parts by volume of a mixture of equal amounts of methyl bromide and benzene at 20° C., there can be obtained the monomethyl bromide of M. P. 217–219° C.

The 1-methyl-3:3-[3'-methyl-3'-azapentylene-(1':5')]-5-hydroxy-indoline used as starting material can be prepared, for example, as follows:

68 parts by weight of 1-methyl-5-ethoxy-oxindole (Julian, Pikl and Wantz, J. A. C. S. 57, 2029 (1935)) and 61 parts by weight of N-methyl-N:N-di-(β-chlorethyl)-amine (nitrogen mustard), in 350 parts by volume of absolute toluene, are treated with stirring and with cooling as necessary, slowly with 29.7 parts by weight of powdered sodamide, added in portions so that the temperature is maintained between 35 and 45° C. Thereupon the whole is gradually heated and finally boiled for two hours under reflux. After cooling, the common salt formed is removed by extracting twice with 200 parts by volume of water and the toluene solution is extracted sufficiently often with 100 parts by volume of 2 N-hydrochloric acid each time, so that finally Mayer's reagent no longer produces a precipitate. Any emulsion produced in this operation is advantageously centrifuged. The combined hydrochloric acid extracts are rendered alkaline with aqueous ammonia with cooling, diluted with water to 2000 parts by volume and extracted five times with a total quantity of 2500 parts by volume of ether. After drying over ignited potassium carbonate, the ether is distilled off and the remaining dark red oil extracted by boiling five times with 500 parts by volume of petrol ether (boiling point 50–70° C.) each time. The petrol ether is distilled off, whereupon the resulting light red oil crystallizes. After repeated recrystallization from petrol ether, the 1-methyl-2:3 - [3' - methyl - 3' - azapentylene - (1':5')] - 5-ethoxy-oxindole thus produced melts at 82–83° C.

19.4 parts by weight of the above oxindole, dissolved in 400 parts by volume of tetrahydrofurane, are carefully added to 19.4 parts by weight of lithium-aluminum hydride in 100 parts by volume of ether and subsequently treated as described in Example 1 for the hydrogenation of 1-methyl-5-hydroxy-oxindole. In this process, in contradistinction from Example 1, the acid solution may be rendered alkaline with 2 N-caustic soda solution instead of with aqueous ammonia. The indoline base which results in the form of a light brown oil, is converted by means of methanolic hydrochloric acid into its hydrochloride and the latter precipitated in crystalline form by addition of a little ether. After repeated recrystallization from methanol-ether, the mono-hydrochloride of 1 - methyl - 3:3-[3'-methyl-3'-azapentylene-(1':5')]-5-ethoxy-indoline melts at 233–235° C.

6.0 parts by weight of the above hydrochloride are well mixed with 50 parts by weight of pyridine hydrochloride and the whole heated in a stream of nitrogen for 4 hours to 180–190° C. Atfer cooling, the residue is dissolved in 150 parts by volume of water, the solution brought to a pH of about 9 with aqueous ammonia, extracted with 200 parts by volume of chloroform, saturated with common salt and again extracted with 100 parts by volume of chloroform. The whole of the operations are carried out as far as possible with the exclusion of air, since the compound is extremely sensitive to oxygen. The combined chloroform extracts are washed with saturated common salt solution, dried with sodium sulfate and concentrated under reduced pressure to a small volume. From the final solution, the 1-methyl-3:3-[3'-methyl-3'-azapentylene-(1':5')]-5-hydroxyindoline crystallizes in violet-red crystals. The hydroxy-indoline, recrystallized several times from acetone and purified by the use of animal charcoal, is colorless and melts at 192–198° C. Since the purification is very difficult, the crude crystallizate is, with advantage, employed for the urethane formation.

*Example 5*

1.75 parts by weight of 1-methyl-6-hydroxy-indoline are treated in the manner described in Example 1 with 0.1 part by weight of triethylamine and 4 parts by volume of methyl isocyanate and working up carried out. The 1 - methyl - 6-(N-methyl-carbamyloxy)-indoline of the formula

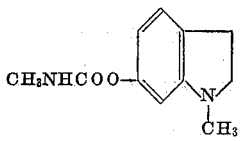

thus obtained, melts at 98° C. after it has been recrystallized from ether and sublimed at 80° C. under 0.1 mm. pressure.

1 part by weight of 1-methyl-6-(N-methyl-carbamyloxy)-indoline is heated to 80° C. for 12–15 hours with 5 parts by weight of methyl bromide in 5 parts by weight of benzene in a bomb tube. The 1:1-dimethyl-6-(N-methyl-carbamyloxy)-indolinium bromide is thus obtained which after recrystallization from a mixture of methanol and ether melts between 158° and 170° C.

The 1-methyl-6-hydroxy-indoline used as starting material can be obtained, for example, from 1-methyl-6-hydroxy-oxindole [prepared in an analogous manner to the 5-hydroxy-compound according to Julian, Pikl and Wantz, J. A. C. S. 57 2029 (1935)] by hydrogenation in the manner described in Example 1 for the 5-hydroxyl compound. The values for the new compounds obtained in this process are:

N-methyl-meta-phenetidine boiling point 138–140° C. under 15 mm. pressure, N-methyl-N-chloracetyl-meta-phenetidine, melting point 73–74° C., 1-methyl-6-hydroxy-oxindole, melting point 209–210° C. when recrystallized from 96 per cent ethanol, 1-methyl-6-hydroxy-indoline, melting point 97° C. after recrystallization from ether and sublimation at 100° C. under 0.1 mm. pressure.

*Example 6*

0.45 part by weight of 1-methyl-7-hydroxy-indoline is treated in the manner described in Example 1 with 0.05 part by weight of triethylamine and 1 part by volume of methyl isocyanate and working up is carried out. The 1-methyl-7-(N-methyl-carbamyloxy)-indoline thus obtained of the formula

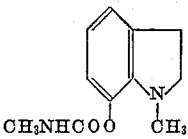

melts at 110–111° C. after it has been recrystallized from ether and sublimed at 110° C. under 0.1 mm. pressure.

The 1-methyl-7-hydroxy-indoline used as starting material can be prepared, for example, as follows:

To 9.2 parts by weight of powdered sodium in 200 parts by volume of benzene, 71.6 parts by weight of ortho-phenacetin are added in portions. Then the whole is heated to boiling for two hours and, into the cooled solution, 32 parts by weight of dimethyl sulfate gradually introduced and then again the whole heated for one hour to boiling. The cooled mixture is washed three times with 40 parts by volume of 2 N-hydrochloric acid and the benzene is removed under vacuum. The residue is hydrolyzed in a solution of 56 parts by weight of caustic soda solution in 200 parts by volume of ethanol and 20 parts by volume of water by heating for 48 hours under reflux, the alcohol is distilled off, water is added until the solution is clear and extraction by shaking is carried out with a total quantity of 750 parts by volume of ether. The ether extract is shaken three times with 150 parts by volume of 2 N-hydrochloric acid each time and the hydrochloric acid solution rendered alkaline and extracted with ether. After washing, drying and evaporation of the ether solution, the residue is distilled at 124–130° C. under 15 mm. pressure and the N-methyl-ortho-phenetidine obtained as a colorless oil. By means of chloracetyl chloride the above compound is converted, in the manner described in Example 5, into the N-methyl-N-chloracetyl-ortho-phenetidine, which after recrystallization several times from petrol ether (boiling point 30–50° C.) melts at 42–43° C.

50 parts by weight of the above compound are intimately mixed with 40 parts by weight of aluminum chloride and the whole heated in an air bath, with stirring, to 150° C., whereby reaction sets in with the melting of the mixture. After 10 minutes a further 35 parts by weight of aluminum chloride are added and, with continued stirring, the temperature raised to 190° C., at which point it is maintained for two hours. After the cooling and pulverizing of the glass-like reaction product, decomposition is effected with 300 parts by weight of ice and the mixture is acidified with 2 N-hydrochloric acid and extracted with chloroform. The 1-methyl-7-hydroxyoxindole is separated, by triple extraction of the chloroform with 100 parts by volume of 2 N-caustic soda solution each time, from a neutral compound, the alkaline-aqueous solution is acidified and is then extracted with ether. After evaporation of the ether solution which has been washed until neutral and dried with sodium sulfate, there crystallizes immediately the 1-methyl-7-hydroxy-oxindole, which, after triple recrystallization from cyclohexane, melts at 221–224° C.

The hydrogenation of the above oxindole by means of lithium-aluminum hydride takes place in the same manner as is described in Example 1 for the 1-methyl-5-hydroxy-oxindole. The crude product distils at 95–105° C. under 0.1 mm. pressure as a colorless oil which immediately crystallizes. After recrystallization from ether-petrol ether and subsequent sublimation at 100° C. under 0.1 mm. pressure, the 1-methyl-7-hydroxy-indoline is obtained of melting point 111–113° C.

*Example 7*

3.0 parts by weight of 1-methyl-6-hydroxy-indoline are dissolved in a solution of 0.8 part by weight of sodium hydroxide in 15 parts by volume of water and then evaporated to dryness under reduced pressure. The resultant solid sodium salt is introduced portionwise into a solution of 2.6 parts by weight of dimethyl carbamyl chloride in 20 parts by volume of absolute benzene while agitating, and the mixture finally refluxed for 2 hours. The mixture is then transferred into a separating funnel with rinsing of the vessel with benzene, washed three times with water, twice with ice-cold 2 N-caustic soda solution and three more times with water. The benzene solution is dried with sodium sulfate, and finally evaporated under reduced pressure. The residual brown oil crystallizes after a short time. The crystal magma is subjected to sublimation under a high vacuum and the sublimate recrystallized from a mixture of ether and hexane. After another sublimation at 0.5 mm. pressure at 110° C. there is obtained the pure 1-methyl-6-(N:N-dimethyl-carbamyloxy)-indoline of the formula

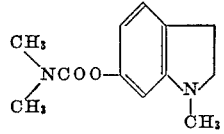

which melts at 63–64° C. By a procedure analogous to that of Example 5 there is obtained from this substance the 1:1-dimethyl-6-(N:N-dimethylcarbamyloxy) - indolinium bromide which melts between 158 and 164° C.

Example 8

3.0 parts by weight of 1-methyl-6-hydroxy-indoline are dissolved in 30 parts by volume of dry benzene and introduced into 100 parts by volume of a 20% solution of phosgene in benzene. The hydrochloride of the base precipitates in the form of crystals and is separated by suction filtering and the filtrate freed from excess phosgene by evaporation under reduced pressure. The oily residue of the chlorcarbonic acid ester obtained in this manner is dissolved in 30 parts by volume of benzene and added dropwise while stirring and cooling to 3.0 parts by volume of a 33% aqueous dimethylamine solution and, after stirring for another hour, allowed to stand over night. The benzene solution is then washed three times with water, twice with ice-cold 2 N-caustic soda solution and again three times with water. After drying over sodium sulfate and evaporation of the solvent under reduced pressure, crystallization of the oily residue sets in soon. The crystals are purified as described in Example 7 to obtain the 1-methyl-6-(N:N-dimethyl-carbamyloxy)-indoline there described.

Example 9

5.0 parts by weight of 1-methyl-6-hydroxy-indoline are dissolved in 70 parts by volume of dry benzene and added dropwise while stirring to 120 parts by volume of a 20% solution of phosgene in benzene. The hydrochloride of the base precipitates in the form of crystals and is separated by suction filtering and the filtrate freed from excess phosgene by evaporation under reduced pressure. The oily residue of the chlorocarbonic acid ester thus obtained is dissolved in 40 parts by volume of benzene and added while stirring and cooling to a solution of 5.7 parts by weight of diphenylamine in 30 parts by volume of benzene, and the whole then stirred for another hour at room temperature and finally refluxed for one hour. After cooling, the solution is washed three times with water, twice with ice-cold 2 N-caustic soda solution and three more times with water, dried with sodium sulfate and evaporated under reduced pressure. After addition of a small quantity of ether, crystals separate from the oily residue. The crystallizate is suction-filtered and the filter residue washed several times with ether to remove the diphenylamine. Recrystallization from a mixture of benzene and hexane is then carried out, followed by sublimation at 160° C. under 0.5 mm. pressure, to obtain the pure 1-methyl-6-(N:N-diphenyl-carbamyloxy)-indoline of the formula

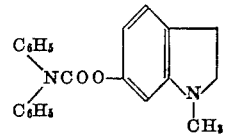

which melts at 158–159° C.

What we claim is:

1. A member selected from the group consisting of 6-carbamyloxy-indolines of the formula

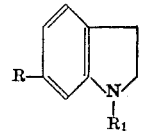

their non-toxic acid salts and non-toxic quaternary lower alkyl ammonium compounds, wherein R represents a carbamyloxy radical and R₁ a lower alkyl radical.

2. 6-carbamyloxy-indolines of the formula

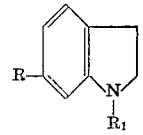

wherein R represents a N-lower alkyl-carbamyloxy radical and R₁ a lower alkyl radical.

3. Non-toxic acid salts of the compounds claimed in claim 2.

4. Non-toxic quaternary lower alkyl ammonium compounds of the 6-carbamyloxy-indolines claimed in claim 2.

5. 1-methyl-6-(N-methyl-carbamyloxy)-indoline.

6. Non-toxic acid salts of 1-methyl-6-(N-methyl-carbamyloxy)-indoline.

7. Non-toxic quaternary lower alkyl ammonium compounds of 1-methyl-6-(N-methyl-carbamyloxy)-indoline.

8. 1:1 - di - lower alkyl - 6 - (N-lower alkyl - carbamyloxy)-indolinium salts of the formula

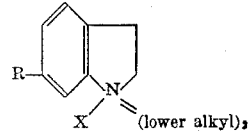

wherein R represents a N-lower alkyl-carbamyloxy radical and X a non-toxic anion.

9. 1:1 - dimethyl - 6 - (N-methyl-carbamyloxy) - indolinium bromide.

10. 1:1 - dimethyl - 6 - (N-methyl-carbamyloxy)-indolinium non-toxic salts.

References Cited in the file of this patent

Gardner: Jour. Am. Chem. Soc. 69, 3086–8 (1947).